US012176670B2

(12) United States Patent
Yudate et al.

(10) Patent No.: US 12,176,670 B2
(45) Date of Patent: Dec. 24, 2024

(54) TERMINAL, TERMINAL-EQUIPPED ELECTRIC WIRE, CONNECTION STRUCTURE, AND MANUFACTURING METHOD OF TERMINAL-EQUIPPED ELECTRIC WIRE

(71) Applicant: YAZAKI CORPORATION, Tokyo (JP)

(72) Inventors: Takahiro Yudate, Makinohara (JP); Tomoya Satoh, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 407 days.

(21) Appl. No.: 17/867,934

(22) Filed: Jul. 19, 2022

(65) Prior Publication Data

US 2023/0021593 A1 Jan. 26, 2023

(30) Foreign Application Priority Data

Jul. 20, 2021 (JP) ................................ 2021-119932

(51) Int. Cl.
*H01R 4/00* (2006.01)
*H01R 4/02* (2006.01)
*H01R 4/58* (2006.01)
*H01R 11/12* (2006.01)
*H01R 43/02* (2006.01)

(52) U.S. Cl.
CPC ............... *H01R 4/58* (2013.01); *H01R 4/023* (2013.01); *H01R 11/12* (2013.01); *H01R 43/0207* (2013.01)

(58) Field of Classification Search
CPC .......... H01R 4/58; H01R 4/023; H01R 11/12; H01R 43/0207
See application file for complete search history.

(56) References Cited

U.S. PATENT DOCUMENTS 4,023,882 A * 5/1977 Pettersson ................ H01R 4/26 439/587
5,110,369 A * 5/1992 Tornstrom ............ H01L 31/048 136/251
6,328,579 B1 * 12/2001 Mori ........................ H01R 4/34 439/97
10,483,665 B2 * 11/2019 Ishihara ................. H01R 11/32
(Continued)

FOREIGN PATENT DOCUMENTS

JP 2005-108608 A 4/2005
JP 2012-38563 A 2/2012
(Continued)

*Primary Examiner* — Phuong Chi Thi Nguyen
(74) *Attorney, Agent, or Firm* — Sughrue Mion, PLLC

(57) ABSTRACT

A terminal-equipped electric wire includes a terminal to be electrically connected to a connection target member, and an electric wire to be connected to the terminal by ultrasonic joining. The terminal includes a joint portion to be connected to the electric wire, a connection portion to be connected to the connection target member, and a plating layer on a surface of the terminal. The connection portion has an uneven shape on at least a part of a surface thereof. When the terminal-equipped electric wire is connected to the connection target member, an insulating coating of the plating layer covering at least a part of the surface of the connection portion is broken.

10 Claims, 6 Drawing Sheets

(56) References Cited

U.S. PATENT DOCUMENTS

| | | | | |
|---|---|---|---|---|
| 2015/0041211 | A1* | 2/2015 | Debock | H01R 4/62 174/126.3 |
| 2016/0336662 | A1 | 11/2016 | Ooba | |
| 2019/0378274 | A1* | 12/2019 | Garnavi | G06N 3/086 |

FOREIGN PATENT DOCUMENTS

| | | | |
|---|---|---|---|
| JP | 2015-22880 | A | 2/2015 |
| JP | 2015-41441 | A | 3/2015 |
| JP | 6616058 | B2 | 12/2019 |

* cited by examiner

TERMINAL, TERMINAL-EQUIPPED ELECTRIC WIRE, CONNECTION STRUCTURE, AND MANUFACTURING METHOD OF TERMINAL-EQUIPPED ELECTRIC WIRE

CROSS-REFERENCE TO RELATED APPLICATIONS

This application is based on and claims priority under 35 USC 119 from Japanese Patent Application No. 2021-119932 filed on Jul. 20, 2021, the contents of which are incorporated herein by reference.

TECHNICAL FIELD

The present invention relates to a terminal, a terminal-equipped electric wire, and a connection structure.

BACKGROUND ART

In the related art, there has been proposed a terminal-equipped electric wire including a terminal electrically connected to a connection target member and made of a copper-based metal, and an aluminum electric wire joined to the terminal by ultrasonic joining (see, for example, Patent Literatures 1 and 2).

CITATION LIST

Patent Literature

Patent Literature 1: JP-A-2005-108608
Patent Literature 2: Japanese Patent No. 6616058

SUMMARY OF INVENTION

In the above configuration, a core wire made of an aluminum-based metal of an aluminum electric wire and a terminal made of a copper-based metal are joined to each other, which is a contact of dissimilar metals. In the contact of the dissimilar metals, for example, when rainwater or the like is applied to a contact portion, corrosion is likely to occur in both (in particular, the aluminum electric wire), which further leads to a progress of corrosion. When such corrosion of the aluminum electric wire progresses, a contact state of the contact portion may deteriorate and electrical characteristics may become unstable, or contact resistance may increase and electrical resistance may increase.

In order to prevent the corrosion caused by the dissimilar metals, there is a method in which a surface of the terminal is plated with the aluminum-based metal. However, the method is not preferable from a viewpoint of joining the electric wire and the terminal. Specifically, since aluminum has a high melting point, it is difficult to join the aluminum electric wire and the terminal, which are made of the aluminum-based metal, to each other by ultrasonic joining. As a method of joining the aluminum electric wire and the terminal, for example, resistance welding may be used. However, thermal degradation may occur in an insulating sheath in the resistance welding. Therefore, the method of joining the aluminum electric wire and the terminal is preferably joining by the ultrasonic joining from the viewpoint of reliability of electrical connection between the aluminum electric wire and the terminal and from the viewpoint of prevention of water immersion.

In the invention of Patent Literature 1, in order to solve the above-described problem, the contact portion between the aluminum electric wire and the terminal is made as small as possible, and the surface of the terminal other than the contact portion is subjected to the tin plating. Since tin plating has a low melting point, it is not suitable for the ultrasonic joining.

In the invention of Patent Literature 2, nickel plating is applied to the contact portion between the aluminum electric wire and the terminal, and the tin plating is applied to the surface of the terminal other than the contact portion. Since nickel plating has a thick oxide film, it is difficult to achieve electrical connection with the connection target member when the plating is performed on a portion other than the contact portion.

In the invention of Patent Literature 1, the contact portion between the aluminum electric wire and the terminal is not changed to the contact of the dissimilar metals, and there is room for improvement in preventing the corrosion of the aluminum electric wire and the terminal. On the other hand, in the invention of Patent Literature 2, two kinds of plating of tin and nickel are required, and the terminal must be subjected to two kinds of processing including tin plating processing and nickel plating processing. Therefore, in the invention of Patent Literature 2, there is room for improvement in terms of production cost and productivity.

The present invention has been made in view of the above circumstances, and an object of the present invention is to provide a terminal, a terminal-equipped electric wire, and a connection structure that prevent corrosion of the electric wire and the terminal and are excellent in production cost and productivity.

A terminal-equipped electric wire according to the present invention includes: a terminal to be electrically connected to a connection target member, and an electric wire to be connected to the terminal by ultrasonic joining.

The terminal includes a joint portion to be connected to the electric wire, a connection portion to be connected to the connection target member, and a plating layer on a surface of the terminal. The connection portion has an uneven shape formed on at least a part of a surface. The terminal-equipped electric wire is implemented such that when the terminal-equipped electric wire is connected to the connection target member, an insulating coating of the plating layer covering the at least part of the surface of the connection portion is broken.

Further, a connection structure according to the present invention includes: a terminal-equipped electric wire having a terminal and an electric wire to be connected to the terminal by ultrasonic joining; and a connection target member to be electrically connected to the terminal-equipped electric wire.

The terminal includes a joint portion to be connected to the electric wire, a connection portion to be connected to the connection target member, and a plating layer on a surface of the terminal. The connection portion has an uneven shape formed on at least a part of the surface. The connection structure includes a portion where the insulating coating of the plating layer is broken between the terminal-equipped electric wire and the connection target member.

In addition, the terminal according to the present invention is a terminal to be connected to an electric wire by ultrasonic joining and to be electrically connected to a connection target member.

The terminal includes a flat plate-shaped joint portion for ultrasonic joining to be connected to the electric wire, a connection portion to be connected to the connection target member, and a plating layer formed of a single plating on a surface of the terminal.

The connection portion has an uneven shape formed on at least a part of the surface. The terminal is implemented such that when the terminal-equipped electric wire is connected to the connection target member, the insulating coating of the plating layer covering the at least part of the surface of the connection portion is broken.

The invention has been briefly described as above. Further, details of the present invention will be further clarified by reading a mode for carrying out the invention described below with reference to the accompanying drawings.

BRIEF DESCRIPTION OF DRAWINGS

FIG. 3A is a schematic cross-sectional view corresponding to FIG. 1, and FIG. 3B is a schematic cross-sectional view corresponding to FIG. 2.

FIG. 6A is an exploded perspective view of a connection structure of the terminal-equipped electric wire according to the second embodiment of the present invention, and FIG. 6B is a cross-sectional view showing a stage in which the terminal-equipped electric wire is being connected to a connection target member.

DESCRIPTION OF EMBODIMENTS

First Embodiment

Figure 1:
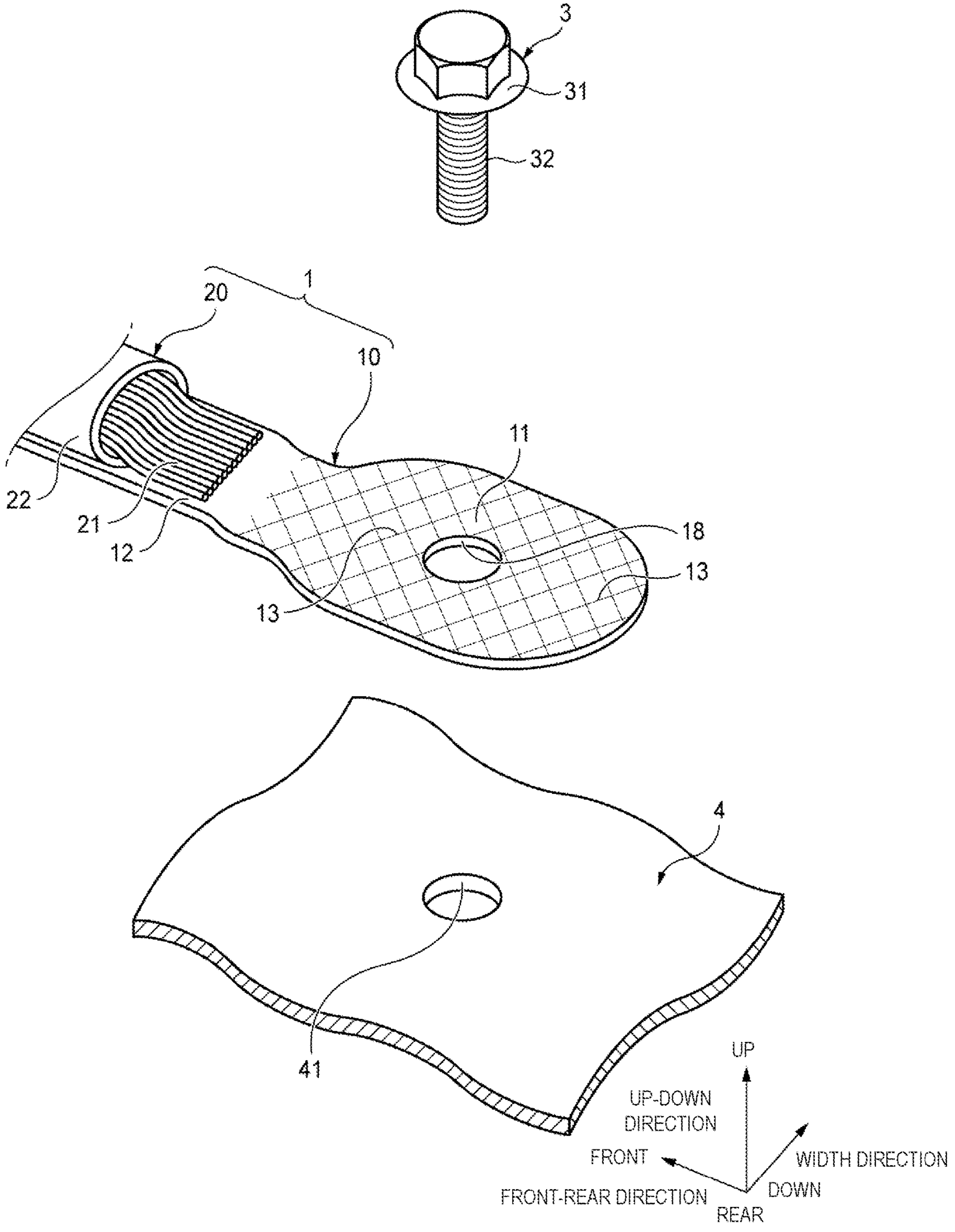
FIG. 1 is an exploded perspective view showing a connection structure of a terminal-equipped electric wire according to a first embodiment of the present invention.
Figure 2:
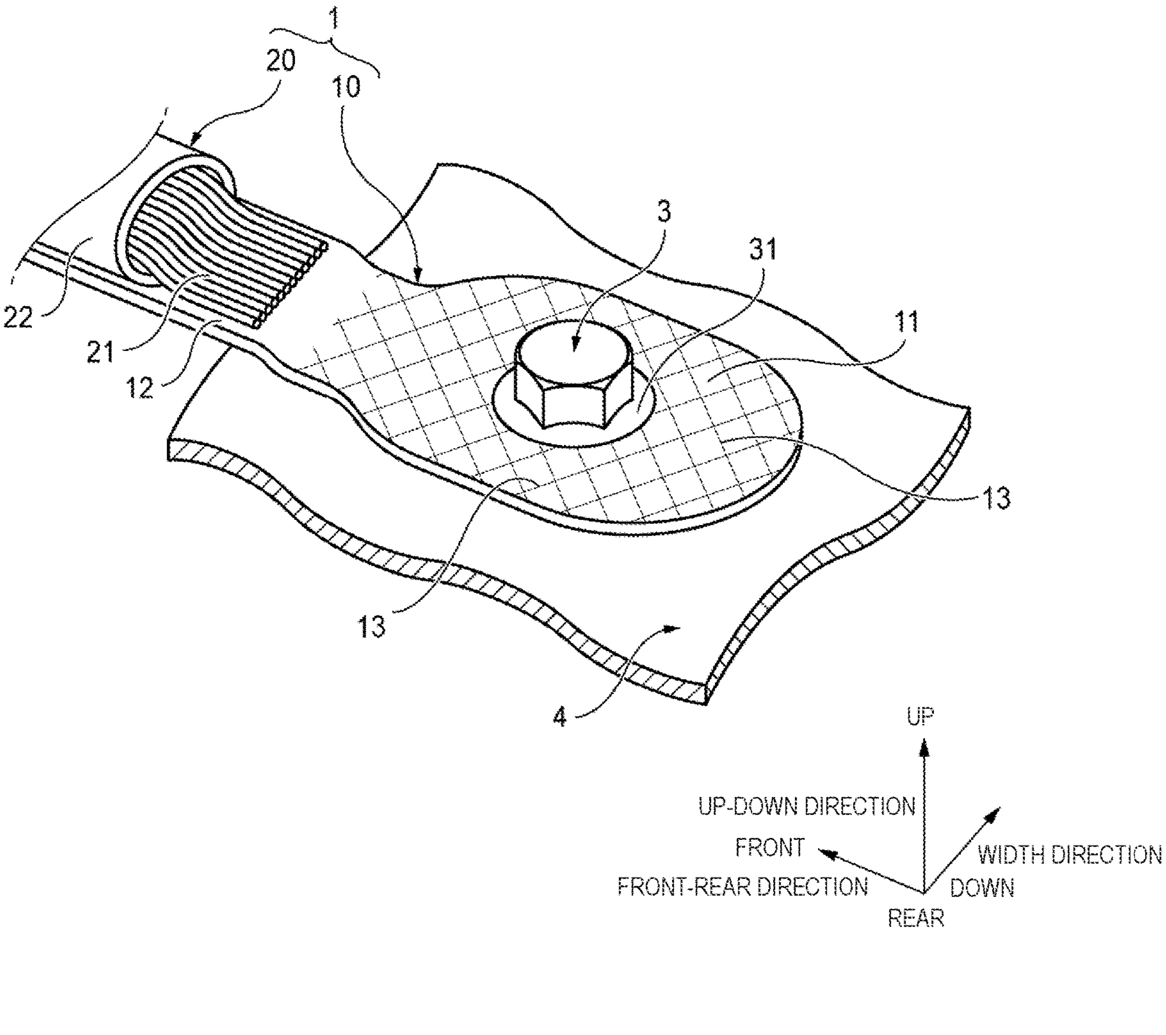
FIG. 2 is a perspective view showing the connection structure of the terminal-equipped electric wire shown in FIG. 1.

Hereinafter, a terminal-equipped electric wire 1 according to a first embodiment of the present invention will be described with reference to the drawings. The terminal-equipped electric wire 1 shown in FIGS. 1 and 2 is fastened to a connection target member 4 having a hole portion 41 for a bolt 3 having a seat surface 31 and a screw portion 32 to use. For convenience of description, in the present embodiment, the terminal-equipped electric wire 1 is electrically connected to the connection target member 4 and the bolt 3.

Hereinafter, as shown in FIGS. 1 to 6B, a "front-rear direction", an "up-down direction", a "width direction", "front", "rear", "up", and "down" are defined for convenience of description. The "front-rear direction", the "up-down direction", and the "width direction" are orthogonal to one another. The front-rear direction corresponds to an extending direction of an electric wire 20 in the present embodiment. The up-down direction corresponds to an assembling direction in which the terminal-equipped electric wire 1 and the connection target member 4 are assembled using the bolt 3. The width direction is a width of the terminal-equipped electric wire 1 when the terminal-equipped electric wire 1 is viewed from above (see FIGS. 5A to 5C).

Further, regarding the terminal-equipped electric wire 1, the bolt 3, and the connection target member 4, a face located on an upper side is referred to as a "front face", a face located on a lower side is referred to as a "back face", and a face connecting the "front face" and the "back face" is referred to as a "side face". A "surface" refers to a face that forms an outer side of each of the terminal-equipped electric wire 1, the bolt 3, and the connection target member 4.

As shown in FIGS. 1 and 2, the screw portion 32 of the bolt 3 is inserted into a through hole 18 of a terminal 10 and the hole portion 41 of the connection target member 4, and the terminal-equipped electric wire 1 is fastened and electrically connected to the connection target member 4. For fastening the terminal-equipped electric wire 1 and the connection target member 4, a female screw may be provided in the hole portion 41, or a nut (not shown) may be provided on a lower side of the connection target member 4.

Figure 4:
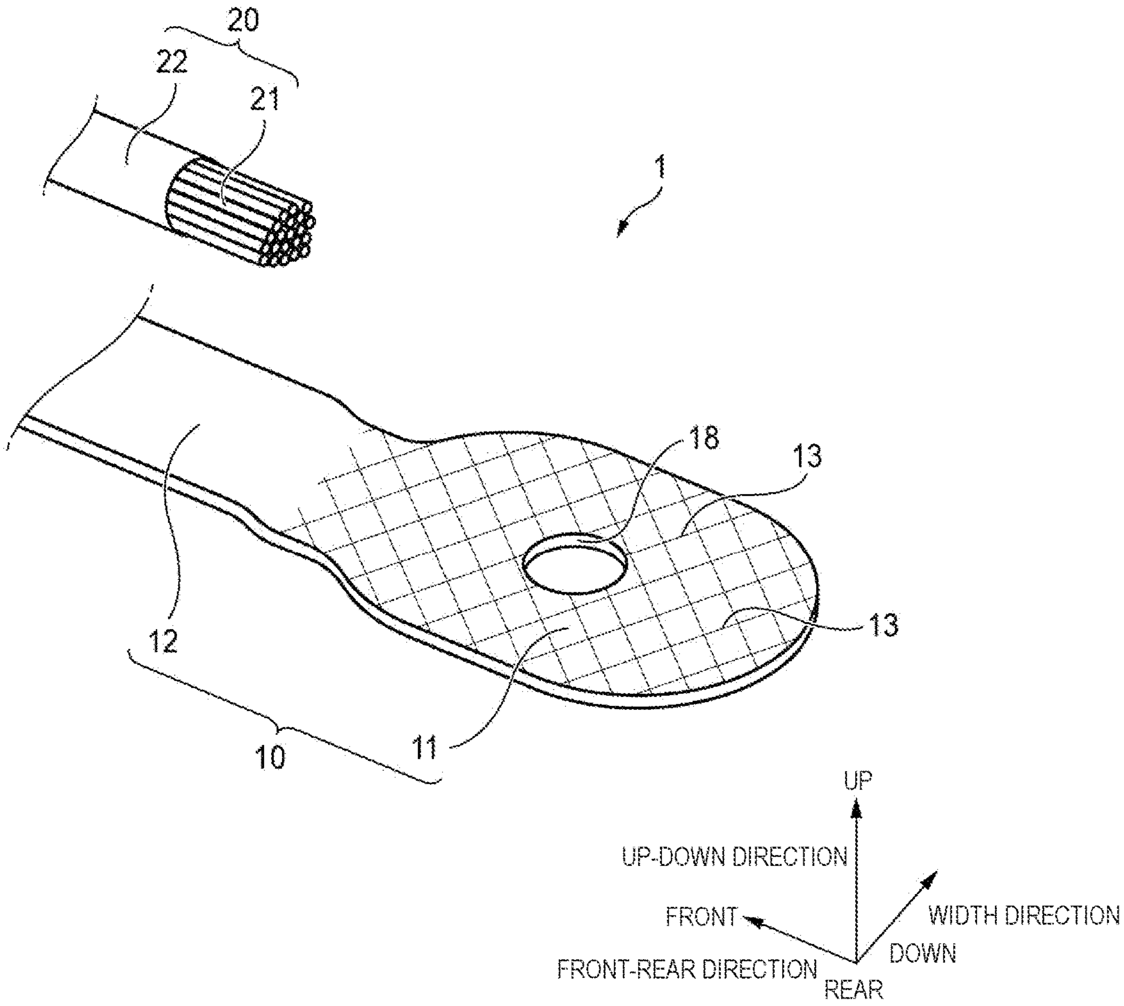
FIG. 4 is an exploded perspective view of the terminal-equipped electric wire shown in FIG. 1.

As shown in FIGS. 1 and 2 and 4, the terminal-equipped electric wire 1 according to the present embodiment includes the terminal 10 and the electric wire 20 connected to the terminal 10 by ultrasonic joining. The electric wire 20 includes a core wire 21 made of, for example, an aluminum-based metal, and a coating 22 made of an insulating material and covering an outer periphery of the core wire 21. The core wire 21 is formed by twisting a plurality of element wires. However, the core wire 21 may be a single core wire. In particular, as shown in FIG. 4, the core wire 21 is exposed at a front end portion of the electric wire 20. The exposed core wire 21 is connected to a joint portion 12 of the terminal 10 by the ultrasonic joining. The core wire 21 may be made of a copper-based metal.

The ultrasonic joining in which the terminal 10 and the electric wire 20 are joined to each other is an intermetallic fusion in which ultrasonic vibration is applied to a connection target by a horn constituting a vibrator of an ultrasonic joining machine (not shown) and the applied ultrasonic vibration is used. For example, in the terminal 10 and the electric wire 20 as the connection target, the terminal 10 is placed on an anvil (not shown) constituting a receiving jig, and the exposed core wire 21 of the electric wire 20 to be described later is disposed at a position corresponding to the joint portion 12 of the terminal 10 to be described later.

Then, the joint portion 12 of the terminal 10 and the core wire 21 of the electric wire 20 are sandwiched by the anvil and the horn, and the ultrasonic vibration is excited in a state in which the joint portion 12 and the core wire 21 are overlapped with each other. Accordingly, the terminal 10 and the electric wire 20 are joined to each other in a solid phase state by plastic deformation due to overlapping portions rubbing against each other by the ultrasonic vibration, thereby forming a joining portion. As a result, the terminal 10 and the electric wire 20 are electrically joined to each other. Also, after the joint portion 12 and the electric wire 20 are connected, a joining mark due to the ultrasonic joining appear in the joint portion 12.

As described above, the terminal 10 to be joined to the electric wire 20 is made of, for example, the copper-based metal. As described above, the terminal 10 is a round terminal (so-called LA terminal or the like) which is fastened and connected to the connection target member 4 by the bolt 3 and is brought into contact with and electrically connected to the connection target member 4.

As shown in FIGS. 1 and 2 and 4, the terminal 10 includes a connection portion 11 to be connected to the connection target member 4 and the joint portion 12 to be joined to the electric wire 20 (that is, the core wire 21). In the connection portion 11, the surfaces of the front face and the back face are subjected to unevenness processing. In other words, the connection portion 11 has an uneven shape 13 on the surfaces of the front face and the back face thereof. If the terminal-equipped electric wire 1 can be electrically connected to the connection target member 4, the uneven shape 13 may have only one surface of the front face and the back face of the connection portion 11. The joint portion 12 is not particularly processed, and is, for example, in a state as it is at the time of purchase. The joint portion 12 has a flat plate shape.

As the unevenness processing, pattern transfer of a mold such as knurling, embossing molding such as indent or serration, or inward bending molding is performed. In particular, as shown in FIG. 4, a grid-shaped uneven shape 13 is formed on the surface of the connection portion 11. Surface roughness of the portion of the connection portion 11 having the uneven shape 13 (that is, roughness of the uneven shape 13) may be rougher than the surface roughness of the portion of the terminal 10 excluding the connection portion 11 and the joint portion 12.

Since the terminal 10 is electrically connected to the electric wire 20 and the connection target member 4, the surface of the terminal 10 is subjected to the plating processing. Plating processing is performed on entire surfaces of the front face and the back face of the terminal 10. In the present embodiment, nickel plating 16 having an insulating coating 17 that is harder and thicker than a metal material constituting the terminal 10 is used as the plating. Further, as the plating, silver plating may be used.

When the surface of the terminal 10 is subjected to the plating processing, an outermost surface of the terminal 10 is covered with the insulating coating 17 of the nickel plating 16. In other words, the terminal 10 has a plating layer including the nickel plating 16 and the insulating coating 17 on the surfaces of the front face and the back face.

Figure 3A:
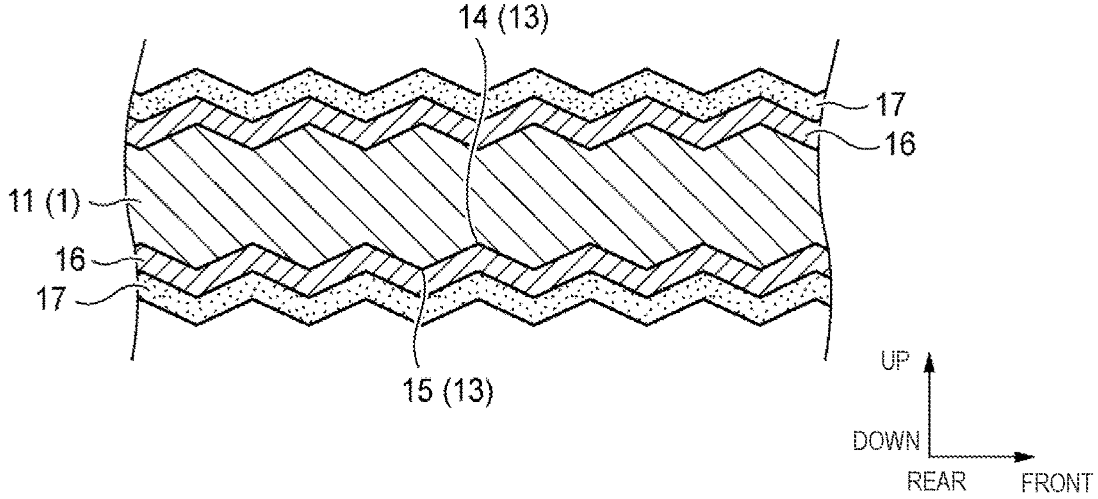
FIGS. 3A and 3B are schematic cross-sectional views showing a state in which an insulating coating is broken at a connection portion of the terminal-equipped electric wire shown in FIG. 1.

As shown in FIG. 3A, in the connection portion 11, similarly, the connection portion 11 includes the plating layer including the nickel plating 16 and the insulating coating 17 on the surfaces of the front face and the back face. However, as described above, since the connection portion 11 has the uneven shape on the surface, the nickel plating 16 and the insulating coating 17 are laminated along a surface shape (that is, unevenness) of the connection portion 11.

As described above, since the nickel plating has a hard and thick insulating coating, the nickel plating is not generally suitable for the plating processing to be performed on the connection portion of the terminal-equipped electric wire to be connected to the connection target member. However, in the present embodiment, since the uneven shape 13 is formed on the surface of the connection portion 11, reliability of the electrical connection with the connection target member 4 is high even when the plating processing by the nickel plating is performed on the surface of the connection portion 11. This will be described below with reference to FIGS. 3A and 3B.

Figure 3B:
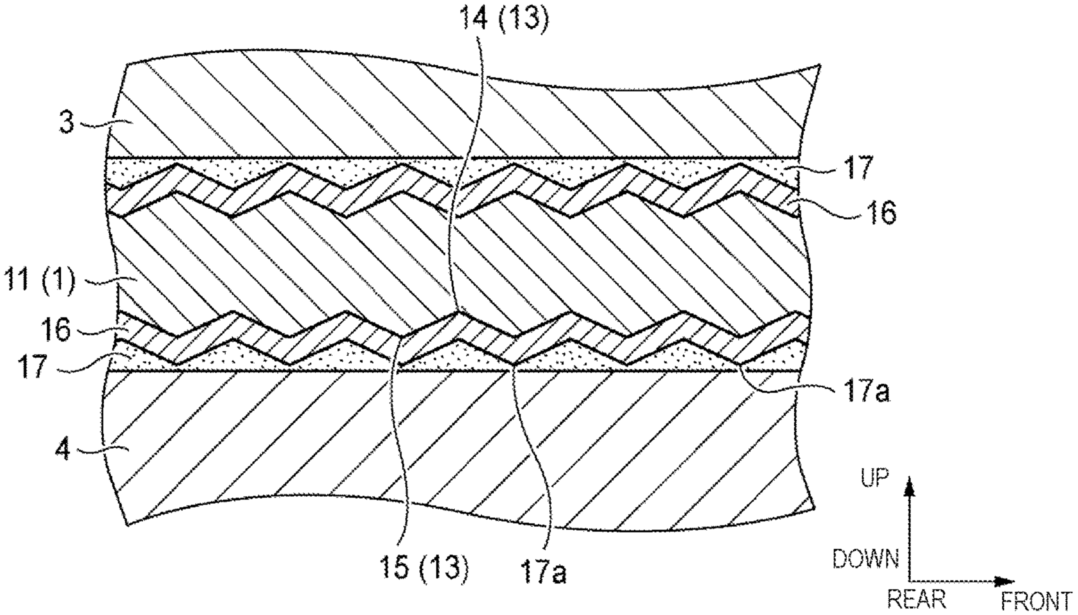

FIGS. 3A and 3B are schematic cross-sectional views showing a state in which the insulating coating 17 in the connection portion 11 of the terminal-equipped electric wire 1 is broken. FIG. 3A is a schematic cross-sectional view before the terminal-equipped electric wire 1 is fastened and connected to the connection target member 4. FIG. 3B is a schematic cross-sectional view after the terminal-equipped electric wire 1 is fastened and connected to the connection target member 4.

As described above, the entire surfaces of the front face and the back face of the terminal 10 are subjected to the nickel plating processing. Accordingly, similarly to the terminal 10, the connection portion 11 has the plating layer including the nickel plating 16 and the insulating coating 17 on the entire surfaces of the front face and the back face. Specifically, since the connection portion 11 has the uneven shape on the surface, the nickel plating 16 and the insulating coating 17 are laminated along the surface shape (that is, unevenness) of the connection portion 11 (see FIG. 3A).

The screw portion 32 of the bolt 3 is inserted into the through hole 18 of the terminal 10 and the hole portion 41 of the connection target member 4, and the terminal-equipped electric wire 1 is fastened and electrically connected to the connection target member 4 (see FIG. 2). Specifically, the terminal-equipped electric wire 1 is fastened such that the front face of the connection portion 11 of the terminal 10 and the seat surface 31 of the bolt 3 are pressed and brought into with each other, and the back face of the connection portion 11 and the front face of the connection target member 4 are pressed and brought into contact with each other.

That is, when the terminal-equipped electric wire 1 is fastened and connected to the connection target member 4, the front face of the connection portion 11 comes into contact with the seat surface 31 of the bolt 3, and the connection portion 11 (terminal-equipped electric wire 1) is pressed downward along the up-down direction by the bolt 3. In other words, when the terminal-equipped electric wire 1 is fastened and connected to the connection target member 4, as shown in FIG. 3B, the insulating coating 17 laminated on the surface of the connection portion 11 is pressed and brought into contact with the bolt 3 (the seat surface 31) on the front face, and is pressed and brought into contact with the connection target member 4 on the back face.

Accordingly, the insulating coating 17 is broken with a portion (top portion 17*a*) laminated along a convex portion 15 among a concave portion 14 and the convex portion 15 forming the uneven shape 13 of the connection portion 11 as a base point. As a result, the insulating coating 17 on the front face of the connection portion 11 is broken and electrically connected to the bolt 3, and the insulating coating 17 on the back face of the connection portion 11 is broken and electrically connected to the connection target member 4.

In the present embodiment, for convenience of description, a state in which the terminal-equipped electric wire 1 is electrically connected to both the bolt 3 and the connection target member 4 is shown. However, when the terminal-equipped electric wire 1 is electrically connected to the connection target member 4 via the bolt 3, the back face of the connection portion 11 may not be subjected to the unevenness processing. Similarly, the bolt 3 only fastens the terminal-equipped electric wire 1 and the connection target member 4 (that is, the terminal-equipped electric wire 1 is not electrically connected to the connection target member 4 via the bolt 3). In this case, the front face of the connection portion 11 may not be subjected to the unevenness processing.

As described above, since the connection portion 11 has the uneven shape 13 on the surface thereof, even when the plating processing is performed by plating having a hard and thick insulating coating such as the nickel plating, the connection portion 11 is electrically connected to the connection target member 4 with high reliability.

As described above, according to the terminal-equipped electric wire 1 according to the present embodiment, since the plating processing is performed on the entire surfaces of the front face and the back face of the terminal 10, the corrosion of the electric wire 20 and the terminal 10 is prevented, and the production cost is excellent by the nickel plating processing which is single and inexpensive.

Next, a method of manufacturing the terminal-equipped electric wire 1 according to the first embodiment will be described. Generally, the plating processing performed on the surface of the terminal 10 includes a so-called pre-plating method in which the plating processing is performed on a long plate-shaped conductive plate member before the plate member is die-cut into a desired terminal shape, and a so-called post-plating method in which the plating processing is performed on the plate member after the plate member is die-cut into the desired terminal shape.

First, a method of manufacturing the terminal-equipped electric wire 1 according to the first embodiment by the pre-plating method will be described. First, the plating processing is performed on the entire surfaces of the front face and the back face of the plate member. Then, the plate member subjected to the plating processing is die-cut into the desired terminal shape, and the surface of the front face or the surface of the back face of the connection portion 11 or both of the front face and the back face are subjected to the unevenness processing. Thereafter, the joint portion 12 of the terminal 10 and the core wire 21 of the electric wire 20 are joined to each other by the ultrasonic joining, whereby the terminal-equipped electric wire 1 is obtained.

In the pre-plating method, an order of the die cutting and the unevenness processing is not limited thereto. That is, after the surface of the front face or the surface of the back face or both of the front face and the back face of a portion of the plate member that can be the connection portion 11 are subjected to the unevenness processing, the plate member may be die-cut into the desired terminal shape.

Further, in the pre-plating method, since the terminal 10 is die-cut after the plate member is subjected to the plating processing, the surface of the side face may not be subjected to the plating processing. Therefore, in the pre-plating method, the surface of the side face of the terminal 10 is subjected to the plating processing before the terminal 10 and the electric wire 20 are joined to each other.

Next, a method of manufacturing the terminal-equipped electric wire 1 according to the first embodiment by the post-plating method will be described. First, the plate member is die-cut into the desired terminal shape, and the surface of the front face or the surface of the back face of the connection portion 11, or both surfaces of the front face and the back face are subjected to the unevenness processing. Then, the surface of the terminal 10 is subjected to the plating processing. Thereafter, the joint portion 12 of the terminal 10 and the core wire 21 of the electric wire 20 are joined to each other by the ultrasonic joining, whereby the terminal-equipped electric wire 1 is obtained.

In the post-plating method, the order of the die cutting and the unevenness processing is not limited thereto. That is, after the surface of the front face or the surface of the back face or both of the front face and the back face of a portion of the plate member that can be the connection portion 11 are subjected to the unevenness processing, the plate member may be die-cut into the desired terminal shape.

As described above, according to the terminal-equipped electric wire 1 in the present embodiment, since the plating processing is performed by the single plating, it is not necessary to separately perform the plating processing on the connection portion 11 and the joint portion 12, and thus the production cost and the productivity are excellent.

The terminal-equipped electric wire 1 according to the first embodiment is described above.

Second Embodiment

Next, a terminal-equipped electric wire 1*a* according to a second embodiment will be described. Regarding the terminal-equipped electric wire 1*a* according to the second embodiment, a configuration different from that of the terminal-equipped electric wire 1 according to the first embodiment will be described. Specifically, the second embodiment differs in a shape of a terminal 10*a*, a connection target member 5, and a state of the insulating coating 17 to be broken.

Figure 6A:
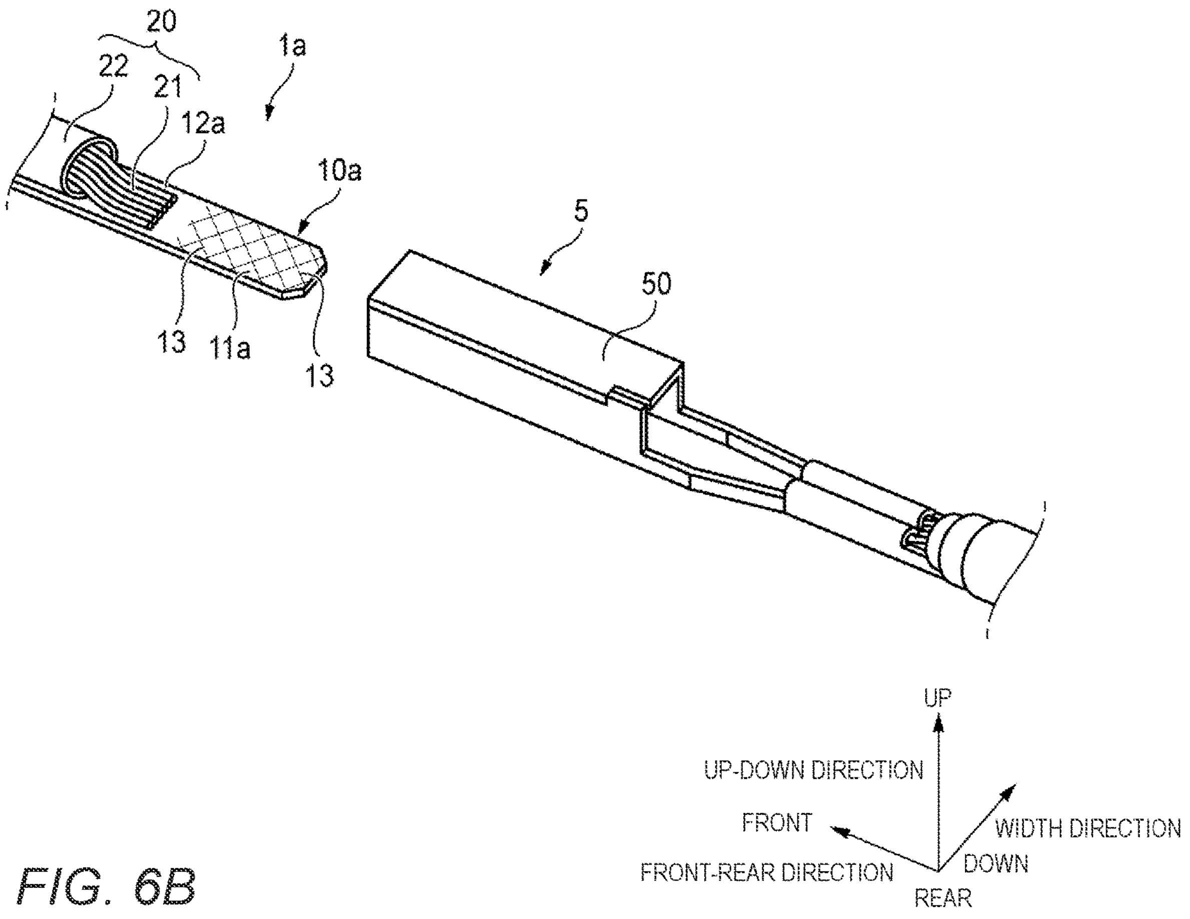
FIGS. 6A and 6B are diagrams of a terminal-equipped electric wire according to a second embodiment of the present invention.
Figure 6B:
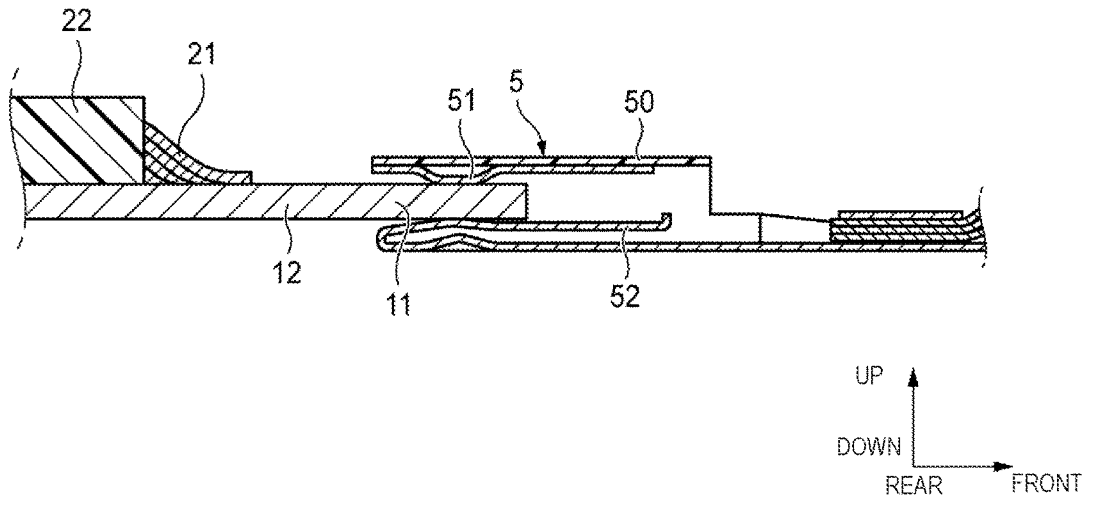

As particularly shown in FIG. 6A, the terminal-equipped electric wire 1*a* includes the terminal 10*a* and the electric wire 20 to be joined to the terminal 10*a* by ultrasonic joining. As shown in FIGS. 6A and 6B, the terminal-equipped electric wire 1*a* is electrically connected by a connection portion 11*a* being inserted into the connection target member 5 (so-called female tab terminal) having a box portion 50, and the connection portion 11*a* and a terminal portion 51 provided inside the box portion 50 coming into contact with each other. That is, the terminal 10*a* of the terminal-equipped electric wire 1*a* is a so-called male tab terminal that is electrically connected to the female tab terminal that is the connection target member 5.

The terminal 10*a* includes the connection portion 11*a* to be connected to the connection target member 5 and a joint portion 12*a* to be joined to an electric wire (that is, the core wire 21). The connection portion 11*a* has the uneven shape 13 on the surface of the front face. As in the first embodiment, the terminal 10*a* is subjected to plating processing with the nickel plating 16. Accordingly, also in the present embodiment, as in the first embodiment, the terminal 10*a* has a plating layer including the nickel plating 16 and the insulating coating 17 on the entire surfaces of the front face and the back face. Since the electric wire 20 is implemented in the same manner as in the first embodiment, the description thereof will be omitted.

A state in which the terminal-equipped electric wire 1*a* and the connection target member 5 are electrically connected (that is, the insulating coating) will be described with reference to FIG. 6B. The terminal-equipped electric wire 1*a* is disposed at a predetermined position so as to be inserted into the box portion 50 of the connection target member 5 along the front-rear direction, and starts to be inserted toward the inside of the box portion 50.

When the connection portion 11*a* is inserted into the box portion 50, an elastic portion 52 located inside the box portion 50 is in contact with the back face of the connection portion 11*a*, and the connection portion 11*a* is continuously inserted while being pressed upward. Accordingly, the front face of the connection portion 11*a* slides on an inner peripheral face (in particular, the terminal portion 51) of the box portion 50 of the connection target member 5.

Accordingly, a frictional force is applied to a portion (corresponding to the top portion 17*a* in the first embodiment) where the insulating coating 17 is laminated along the convex portion 15 (see FIGS. 3A and 3B) of the uneven shape 13 of the connection portion 11*a*, and the insulating coating is broken with the portion as a base point.

When the connection portion 11*a* is inserted to the predetermined position, the connection portion 11*a* and the terminal portion 51 come into contact with each other, and the terminal-equipped electric wire 1*a* and the connection target member 5 are electrically connected to each other.

Even after the connection portion 11*a* is inserted to the predetermined position, when the connection portion 11*a* is pressed upward by the elastic portion 52, the front face of the connection portion 11*a* and the terminal portion 51 are pressed and brought into contact with each other, so that the insulating coating 17 is reliably broken. Accordingly, in the above case, the reliability of the electrical connection between the terminal-equipped electric wire 1*a* and the connection target member 5 is high.

As described above, also in the terminal-equipped electric wire 1*a* according to the second embodiment, corrosion of the electric wire and the terminal is prevented, and the production cost and the productivity are excellent.

The second embodiment is described above. As described above, the description of the same configuration as that of the first embodiment is omitted.

Functions and Effects

The terminal-equipped electric wire 1 according to the present embodiment will be described below. The terminal-equipped electric wire 1 according to the present embodiment includes the terminal 10 having the joint portion 12 to be connected to the electric wire 20 and the connection portion 11 to be connected to the connection target member 4, and the electric wire 20 to be joined to the terminal 10 by ultrasonic joining. The terminal 10 has a plating layer formed of a single plating on a surface thereof, and the connection portion 11 has the uneven shape 13 on the surface thereof. With such a configuration, when the terminal-equipped electric wire 1 and the connection target member 4 are connected to each other, the insulating coating 17 of the plating layer covering the surface of the connection portion 11 is broken. Specifically, when the terminal-equipped electric wire 1 comes into contact with the connection target member 4, the insulating coating 17 covering the surface of the uneven shape 13 is broken with the convex portion of the uneven shape 13 on the surface of the connection portion 11 as the base point. Accordingly, the terminal-equipped electric wire 1 is electrically connected to the connection target member 4. As described above, in the terminal-equipped electric wire 1 according to the present embodiment, since the terminal has the uneven shape on the surface, for example, the plating layer can be formed of the single plating, corrosion of the electric wire 20 and the terminal 10 is prevented, and the production cost and the productivity are excellent.

Further, according to the terminal-equipped electric wire 1 in the present embodiment, since the plating layer is formed of the single plating, the corrosion of the electric wire 20 and the terminal 10 is prevented, and the production cost and the productivity are excellent.

Further, according to the terminal-equipped electric wire 1 in the present embodiment, the reliability of the electrical connection between the terminal-equipped electric wire 1 and the connection target member 4 is high due to the above-described configuration even for the plating having the hard and thick insulating coating 17 such as the nickel plating 16.

Further, according to the terminal-equipped electric wire 1 in the present embodiment, when the terminal-equipped electric wire 1 and the connection target member 4 are connected to each other, the insulating coating 17 covering the surface of the connection portion 11 is broken by the terminal 10 being pressed and brought into contact with the connection target member 4. Therefore, the terminal-equipped electric wire 1 according to the present embodiment exhibits the same effects as described above even in the terminal 10 (for example, a round terminal or the like) that is connected to the connection target member 4 using a fastening member such as the bolt 3.

The connection structure according to the present embodiment also achieves the same effects as described above.

Although the functions and effects described above are denoted by the reference numerals of the first embodiment, the same functions and effects are also exhibited in the second embodiment.

Further, according to the terminal-equipped electric wire 1*a* according to the second embodiment, when the terminal-equipped electric wire 1*a* and the connection target member 5 are connected to each other, the insulating coating 17 covering the surface of the connection portion 11 is broken by the terminal 10*a* sliding with respect to the connection target member 5. Therefore, in the terminal-equipped electric wire 1*a* according to the second embodiment, the connection target member 5 is a terminal (so-called female tab terminal) having a box shape, and the terminal 10*a* (so-called male tab terminal) inserted into the connection target member 5 has the same effect as described above.

Other Embodiments

The present invention is not limited to the embodiments described above, and modifications, improvements, and the like can be made as appropriate. In addition, materials, shapes, dimensions, numbers, arrangement portions, and the like of components in the above-described embodiment are optional and not limited as long as the present invention can be achieved.

Although the nickel plating 16 is used in the first and second embodiments, the present invention is not limited to the nickel plating 16 as long as it has a hard and thick insulating coating.

Figure 5A:
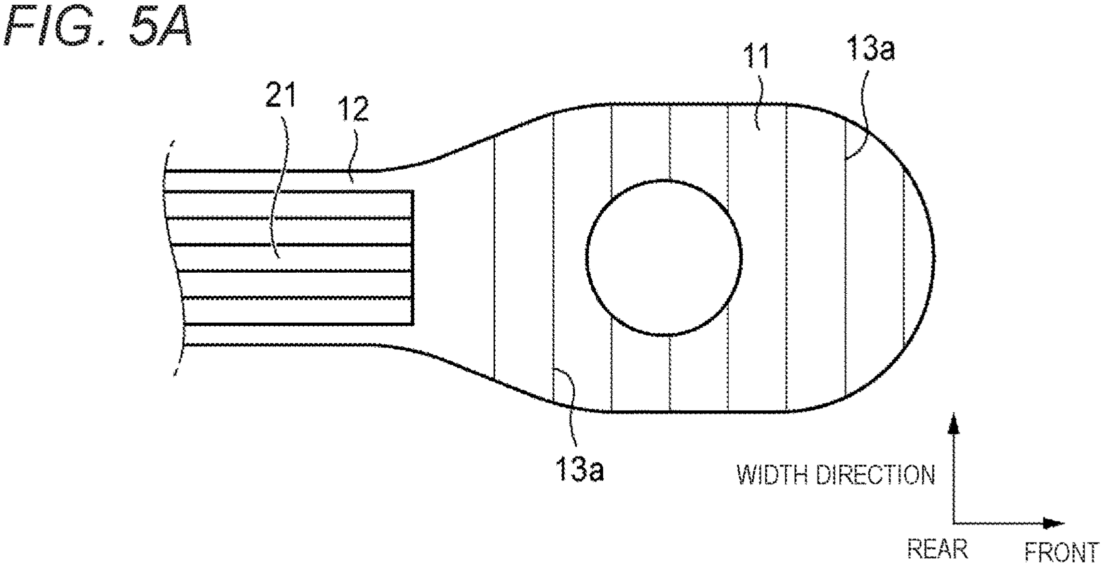
FIGS. 5A, 5B and 5C are front views showing various uneven shapes.

As shown in FIG. 5A, the uneven shape may be a striped uneven shape 13*a* in which a plurality of concave portions or convex portions extending in one direction (in the present example, the width direction) are arranged at predetermined intervals.

Figure 5B:
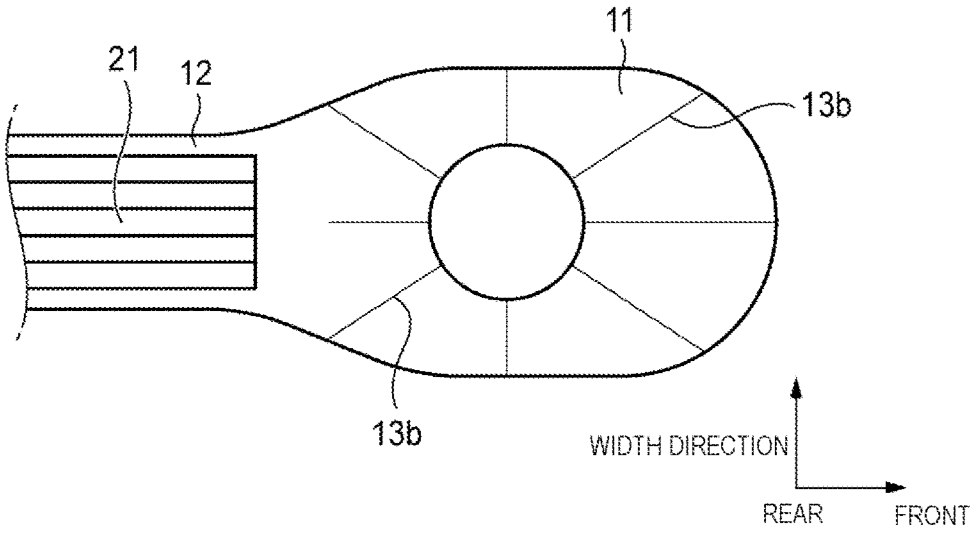

As shown in FIG. 5B, the uneven shape may be a radial uneven shape 13*b* in which the concave portion or the convex portion extends around the through hole 18.

Figure 5C:
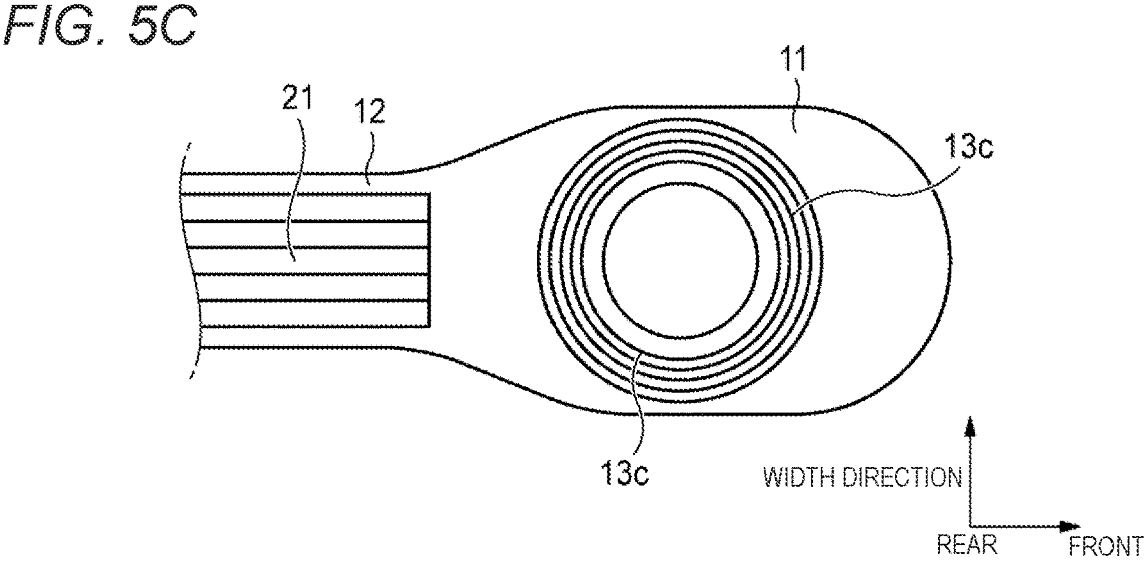

As shown in FIG. 5C, the uneven shape may be a concentric uneven shape 13*c* including a plurality of concave portions or convex portions centered on the through hole 18.

Also in the terminal-equipped electric wire 1*a* according to the second embodiment, the connection portion 11*a* may have the uneven shape as shown in FIGS. 5A to 5C.

Here, characteristics of the embodiments of the terminal, the terminal-equipped electric wire, and the connection structure according to the present invention described above will be briefly summarized and listed in [1] to [12] below.

[1]

A terminal-equipped electric wire (1, 1*a*) including a terminal (10, 10*a*) to be electrically connected to a connection target member, and an electric wire (20) to be connected to the terminal by ultrasonic joining, in which the terminal (10, 10*a*) includes a joint portion (12, 12*a*) to be connected to the electric wire, a connection portion (11, 11*a*) to be connected to the connection target member, and a plating layer (nickel plating 16, an insulating coating 17) on a surface of the terminal, the connection portion (11, 11*a*) has an uneven shape (13) formed on at least a part of a surface of the connection portion, and the terminal-equipped electric wire (1, 1*a*) is implemented such that when the terminal-equipped electric wire (1, 1*a*) is connected to the connection target member (4, 5), the insulating coating (17) of the plating layer covering the at least part of the surface of the connection portion is broken.

[2]

In the terminal-equipped electric wire (1, 1*a*) according to [1], the plating layer (the nickel plating 16 and the insulating coating 17) are formed of a single plating.

[3]

The terminal-equipped electric wire (1, 1*a*) according to [1] or [2], in which the terminal (10, 10*a*) is formed of a metal material, and the plating is formed of a metal material harder than the terminal.

[4]

In the terminal-equipped electric wire (1, 1*a*) according to [3], the plating is the nickel plating (16) or the silver plating.

[5]

The terminal-equipped electric wire (1, 1*a*) according to any one of [1] to [4], in which when the terminal-equipped electric wire (1, 1*a*) and the connection target member (4, 5) are connected to each other, the terminal (10, 10*a*) is pressed and brought into contact with the connection target member (4, 5), whereby the insulating coating (17) is broken.

[6]

The terminal-equipped electric wire (1*a*) according to any one of [1] to [5], in which when the terminal-equipped electric wire (1*a*) and the connection target member (5) are connected to each other, the terminal (10*a*) slides with respect to the connection target member (5), whereby the insulating coating (17) is broken.

[7]

A connection structure includes: a terminal-equipped electric wire (1, 1*a*) having a terminal (10, 10*a*) and an electric wire (20) to be connected to the terminal by ultrasonic joining; and a connection target member (4, 5) to be electrically connected to the terminal-equipped electric wire, in which the terminal (10, 10*a*) includes a joint portion (12, 12*a*) to be connected to the electric wire, a connection portion (11, 11*a*) to be connected to the connection target member, and a plating layer (nickel plating 16, an insulating coating 17) on a surface of the terminal, the connection portion (11, 11*a*) has an uneven shape formed on at least a part of the surface, and the connection structure includes a portion where the insulating coating (17) of the plating layer is broken between the terminal-equipped electric wire (1, 1*a*) and the connection target member (4, 5).

[8]

A terminal (10, 10*a*) to be connected to an electric wire (20) by ultrasonic joining and to be electrically connected to a connection target member (4, 5), the terminal includes:

a flat plate-shaped joint portion (12, 12*a*) for ultrasonic joining to be connected to the electric wire;

a connection portion (11, 11*a*) to be connected to the connection target member, and a plating layer (nickel plating 16, an insulating coating 17) formed of a single plating on a surface of the terminal, in which the connection portion (11, 11*a*) has an uneven shape (13) formed on at least a part of the surface, and the terminal (10, 10*a*) is implemented such that when the terminal-equipped electric wire (1, 1*a*) is connected to the connection target member (4, 5), the insulating coating (17) of the plating layer covering the at least part of the surface of the connection portion (11, 11*a*) is broken.

[9]

A manufacturing method of the terminal-equipped electric wire described in [1], the manufacturing method including:

performing plating processing on the surface of the terminal (10, 10*a*) so as to cover the surface of the terminal with a plating layer;

forming an uneven shape (13) on the part of at least the surface of the connection portion (11, 11*a*) of the terminal (10, 10*a*);

pressing and bringing into contact with the connection target member and the surface of the connection portion (11, 11*a*) of the terminal (10, 10*a*) such that an insulating coating (17) of the plating layer is broken; and subsequently joining the terminal (10, 10*a*) and the electric wire (20) by ultrasonic joining.

[10]

A manufacturing method of the terminal-equipped electric wire described in [1], the manufacturing method including:

performing plating processing on the surface of the terminal (10, 10*a*) so as to cover the surface of the terminal with a plating layer;

forming an uneven shape (13) on the part of at least the surface of the connection portion (11, 11*a*) of the terminal (10, 10*a*);

sliding the connection portion (11, 11*a*) of the terminal (10, 10*a*) with respect to the connection target member (4, 5) such that an insulating coating (17) of the plating layer is broken; and subsequently joining the terminal (10, 10*a*) and the electric wire (20) by ultrasonic joining.

[11]

A manufacturing method of the terminal-equipped electric wire described in [1], the manufacturing method including:

forming an uneven shape (13) on the part of at least the surface of the connection portion (11, 11*a*) of the terminal (10, 10*a*);

performing plating processing on the surface of the terminal (10, 10*a*) so as to cover the surface of the terminal with a plating layer;

pressing and bringing into contact with the connection target member and the surface of the connection portion (11, 11*a*) of the terminal (10, 10*a*) such that an insulating coating (17) of the plating layer is broken; and subsequently joining the terminal (10, 10*a*) and the electric wire (20) by ultrasonic joining.

[12]

A manufacturing method of the terminal-equipped electric wire described in [1], the manufacturing method including:

forming an uneven shape (13) on the part of at least the surface of the connection portion (11, 11*a*) of the terminal (10, 10*a*);

performing plating processing on the surface of the terminal (10, 10*a*) so as to cover the surface of the terminal with a plating layer;

sliding the connection portion (11, 11*a*) of the terminal (10, 10*a*) with respect to the connection target member (4, 5) such that an insulating coating (17) of the plating layer is broken; and subsequently joining the terminal (10, 10*a*) and the electric wire (20) by ultrasonic joining.

The terminal-equipped electric wire having the configuration of [1] will be described below. The terminal-equipped electric wire according to the present configuration includes a terminal having a joint portion to be connected to an electric wire and a connection portion to be connected to a connection target member, and an electric wire to be joined to the terminal by ultrasonic joining. The terminal has a plating layer on a surface thereof, and the connection portion has an uneven shape on a surface thereof. With the present configuration, when the terminal-equipped electric wire and the connection target member are connected to each other, the insulating coating of the plating layer covering the surface of the connection portion is broken. Specifically, when the terminal-equipped electric wire comes into contact with the connection target member, the insulating coating covering the surface of the uneven shape is broken with the convex portion of the uneven shape on the surface of the connection portion as a base point. Accordingly, the terminal-equipped electric wire is electrically connected to the connection target member. As described above, in the terminal-equipped electric wire according to the present configuration, since the terminal has the uneven shape on the surface, for example, the plating layer can be formed of the single plating, corrosion of the electric wire and the terminal is prevented, and the production cost and the productivity are excellent.

In the present invention, the plating applied to the surface of the terminal is a plating having a hard and thick insulating coating. Plating (for example, tin plating) having a soft and thin insulating coating is not suitable for the ultrasonic joining.

According to the terminal-equipped electric wire having the configuration of [2], since the plating layer is formed of the single plating, the corrosion of the electric wire and the terminal is prevented, and the production cost and the productivity are excellent.

According to the terminal-equipped electric wire having the configuration of the above [3], even when the plating is formed of a metal material harder than the terminal formed of the metal material, the same effect as that of the above [1] is obtained.

According to the terminal-equipped electric wire having the configuration of the above [4], the same effect as that of the above [1] can be obtained even for the plating having a hard and thick insulating coating such as nickel plating.

According to the terminal-equipped electric wire having the configuration of the above [5], when the terminal-equipped electric wire and the connection target member are connected to each other, the insulating coating covering the surface of the connection portion is broken by the terminal being pressed and brought into contact with the connection target member. Therefore, the terminal-equipped electric wire according to the present configuration exhibits the same effect as that of the above [1] even in a terminal (for example, a round terminal or the like) to be connected to the connection target member using a fastening member.

According to the terminal-equipped electric wire having the configuration of [6], when the terminal-equipped electric wire and the connection target member are connected to each other, the terminal slides with respect to the connection target member, whereby the insulating coating covering the surface of the connection portion is broken. Therefore, in the terminal-equipped electric wire according to the present configuration, the connection target member is a terminal (so-called female tab terminal) having a box shape, and a terminal (so-called male tab terminal) to be inserted into the connection target member also has the same effect as that of the above [1].

The connection structure having the configuration of [7] will be described below. The connection structure according to the present configuration includes a terminal-equipped electric wire and a connection target member that is electrically connected to the terminal-equipped electric wire. The terminal-equipped electric wire includes a terminal having a joint portion to be connected to an electric wire and a connection portion to be connected to a connection target member, and an electric wire to be joined to the terminal by ultrasonic joining. The terminal has a plating layer formed of a single plating on a surface thereof, and the connection portion has the uneven shape on the surface thereof. With the present configuration, when the terminal-equipped electric wire and the connection target member are connected to each other, the insulating coating of the plating layer covering the surface of the connection portion is broken. Specifically, when the terminal-equipped electric wire comes into contact with the connection target member, the insulating coating covering the surface of the uneven shape is broken with the convex portion of the uneven shape on the surface of the connection portion as a base point. That is, the connection structure according to the present configuration includes a portion where the insulating coating of the plating layer is broken between the terminal-equipped electric wire and the connection target member. Accordingly, the terminal-equipped electric wire and the connection target member are electrically connected to each other. As described above, in the connection structure according to the present configuration, since the terminal has the uneven shape on the surface, for example, the plating layer can be formed of the single plating, corrosion of the electric wire and the terminal is prevented, and the production cost and the productivity are excellent.

According to the terminal having the configuration of the above [8], similarly to the terminal-equipped electric wire according to the above [1], since the terminal has the uneven shape on the surface and the plating layer is formed of the single plating, the corrosion of the terminal and the electric wire to be joined is prevented, and the production cost and the productivity are excellent.

As described above, according to the present invention, it is possible to provide a terminal, a terminal-equipped electric wire, and a connection structure that prevent corrosion of an electric wire and the terminal and are excellent in production cost and productivity.

What is claimed is:

1. A terminal-equipped electric wire comprising:

a terminal that is configured to be electrically connected to a connection target member; and an electric wire that is configured to be connected to the terminal by ultrasonic joining, wherein the terminal includes a joint portion to be connected to the electric wire, a connection portion to be connected to the connection target member, and a plating layer on a surface of the terminal, wherein at least a part of a surface of the connection portion has an uneven shape, and wherein the terminal-equipped electric wire is configured such that an insulating coating of the plating layer covering the at least part of the surface of the connection portion is broken when the terminal-equipped electric wire is connected to the connection target member.

2. The terminal-equipped electric wire according to claim 1 wherein when the terminal-equipped electric wire and the connection target member are connected to each other, the terminal is pressed and brought into contact with the connection target member such that the insulating coating is broken.

3. The terminal-equipped electric wire according to claim 1, wherein when the terminal-equipped electric wire and the connection target member are connected to each other, the terminal slides with respect to the connection target member such that the insulating coating is broken.

4. The terminal-equipped electric wire according to claim 1, wherein the plating layer is formed of a single plating.

5. The terminal-equipped electric wire according to claim 4, wherein the terminal is formed of a metal material, and the plating is formed of a metal material harder than the terminal.

6. The terminal-equipped electric wire according to claim 5, wherein the plating is a nickel plating or a silver plating.

7. A connection structure comprising:

a terminal-equipped electric wire having a terminal and an electric wire to be connected to the terminal by ultrasonic joining; and a connection target member to be electrically connected to the terminal-equipped electric wire, wherein the terminal is configured to include a joint portion to be connected to the electric wire, a connection portion to be connected to the connection target member, and a plating layer on a surface of the terminal, wherein at least a part of a surface of the connection portion has an uneven shape, and wherein the connection structure include a portion where an insulating coating of the plating layer is broken between the terminal-equipped electric wire and the connection target member.

8. A terminal to be connected to an electric wire by ultrasonic joining and to be electrically connected to a connection target member, the terminal comprising:

a flat plate-shaped joint portion for ultrasonic joining to be connected to the electric wire;

a connection portion to be connected to the connection target member; and a plating layer formed of a single plating on a surface of the terminal, wherein at least a part of a surface the connection portion has an uneven shape, and the terminal is configured such that an insulating coating of the plating layer covering the at least part of the surface of the connection portion is broken when the terminal-equipped electric wire is connected to the connection target member.

9. A manufacturing method for manufacturing a terminal-equipped electric wire comprising:

a terminal that is configured to be electrically connected to a connection target member; and an electric wire that is configured to be connected to the terminal by ultrasonic joining, wherein the terminal includes:

a joint portion to be connected to the electric wire, a connection portion to be connected to the connection target member, and a plating layer on a surface of the terminal, wherein at least a part of a surface of the connection portion has an uneven shape, and wherein the terminal-equipped electric wire is configured such that an insulating coating of the plating layer covering the at least part of the surface of the connection portion is broken when the terminal-equipped electric wire is connected to the connection target member, the manufacturing method comprising:

performing plating processing on the surface of the terminal so as to cover the surface of the terminal with a plating layer;

forming an uneven shape on the part of at least the surface of the connection portion of the terminal;

pressing and bringing into contact with the connection target member and the surface of the connection portion of the terminal such that an insulating coating of the plating layer is broken; and joining the terminal and the electric wire by ultrasonic joining.

10. A manufacturing method for manufacturing a terminal-equipped electric wire comprising:

a terminal that is configured to be electrically connected to a connection target member; and an electric wire that is configured to be connected to the terminal by ultrasonic joining, wherein the terminal includes:

a joint portion to be connected to the electric wire, a connection portion to be connected to the connection target member, and a plating layer on a surface of the terminal, wherein at least a part of a surface of the connection portion has an uneven shape, and wherein the terminal-equipped electric wire is configured such that an insulating coating of the plating layer covering the at least part of the surface of the connection portion is broken when the terminal-equipped electric wire is connected to the connection target member, the manufacturing method comprising:

performing plating processing on the surface of the terminal so as to cover the surface of the terminal with a plating layer;

forming an uneven shape on the part of at least the surface of the connection portion of the terminal;

sliding the connection portion of the terminal with respect to the connection target member such that an insulating coating of the plating layer is broken; and joining the terminal and the electric wire by ultrasonic joining.

* * * * *